United States Patent
Utsumi

(10) Patent No.: US 9,390,314 B2
(45) Date of Patent: Jul. 12, 2016

(54) METHODS AND APPARATUS FOR DETERMINING DIMENSIONS OF AN ITEM USING 3-DIMENSIONAL TRIANGULATION

(71) Applicant: Yoshitaka Utsumi, Kamakura (JP)

(72) Inventor: Yoshitaka Utsumi, Kamakura (JP)

(73) Assignee: NCR Corporation, Duluth, GA (US)

( * ) Notice: Subject to any disclaimer, the term of this patent is extended or adjusted under 35 U.S.C. 154(b) by 192 days.

(21) Appl. No.: 14/193,261

(22) Filed: Feb. 28, 2014

(65) Prior Publication Data

US 2015/0248578 A1 Sep. 3, 2015

(51) Int. Cl.
| | |
|---|---|
| *G06K 9/00* | (2006.01) |
| *H04N 13/00* | (2006.01) |
| *H04N 9/10* | (2006.01) |
| *G01S 5/16* | (2006.01) |
| *G01B 11/24* | (2006.01) |
| *G06T 7/00* | (2006.01) |
| *H04N 101/00* | (2006.01) |

(52) U.S. Cl.
CPC ............ *G06K 9/00201* (2013.01); *G01B 11/24* (2013.01); *G01S 5/16* (2013.01); *G06T 7/0018* (2013.01); *G06T 7/0065* (2013.01); *H04N 9/10* (2013.01); *H04N 13/0007* (2013.01); *G06K 2209/40* (2013.01); *H04N 2101/00* (2013.01); *H04N 2201/04743* (2013.01); *H04N 2213/005* (2013.01)

(58) Field of Classification Search
CPC .... G06K 9/00201; G01B 11/02; G06T 7/003; G06T 7/0028; H04N 13/0007; H04N 9/10; G01S 5/16
See application file for complete search history.

(56) References Cited

U.S. PATENT DOCUMENTS

| | | | | |
|---|---|---|---|---|
| 7,422,147 | B2* | 9/2008 | Rosenbaum | G06Q 20/20 235/383 |
| 8,678,286 | B2* | 3/2014 | Smith | G06K 7/10554 235/462.12 |
| 9,082,142 | B2* | 7/2015 | Svetal | G06Q 30/06 |
| 2007/0031064 | A1* | 2/2007 | Zhao | G06K 9/00214 382/285 |
| 2008/0298672 | A1* | 12/2008 | Wallack | G06K 9/32 382/154 |
| 2009/0090583 | A1* | 4/2009 | Bonner | G06Q 30/06 186/59 |
| 2013/0048723 | A1* | 2/2013 | King | G06Q 30/02 235/383 |
| 2014/0316916 | A1* | 10/2014 | Hay | G06Q 20/18 705/17 |
| 2015/0248578 | A1* | 9/2015 | Utsumi | G06K 9/00201 382/154 |

* cited by examiner

*Primary Examiner* — Gregory M Desire
(74) *Attorney, Agent, or Firm* — Harden E. Stevens, III

(57) ABSTRACT

Methods and apparatus are provided for determining the dimensions of an unknown item using multiple images captured by different cameras. The dimensions include the height, length and width of the item. The dimensions are used to reduce the universe of possible candidates that would identify the unknown item. The methods use multiple reference planes and projects elements of the item onto the one or more of the reference planes to determine the coordinates of the elements of the item. Once the coordinates are determined, the dimensions of the items are determined.

20 Claims, 6 Drawing Sheets

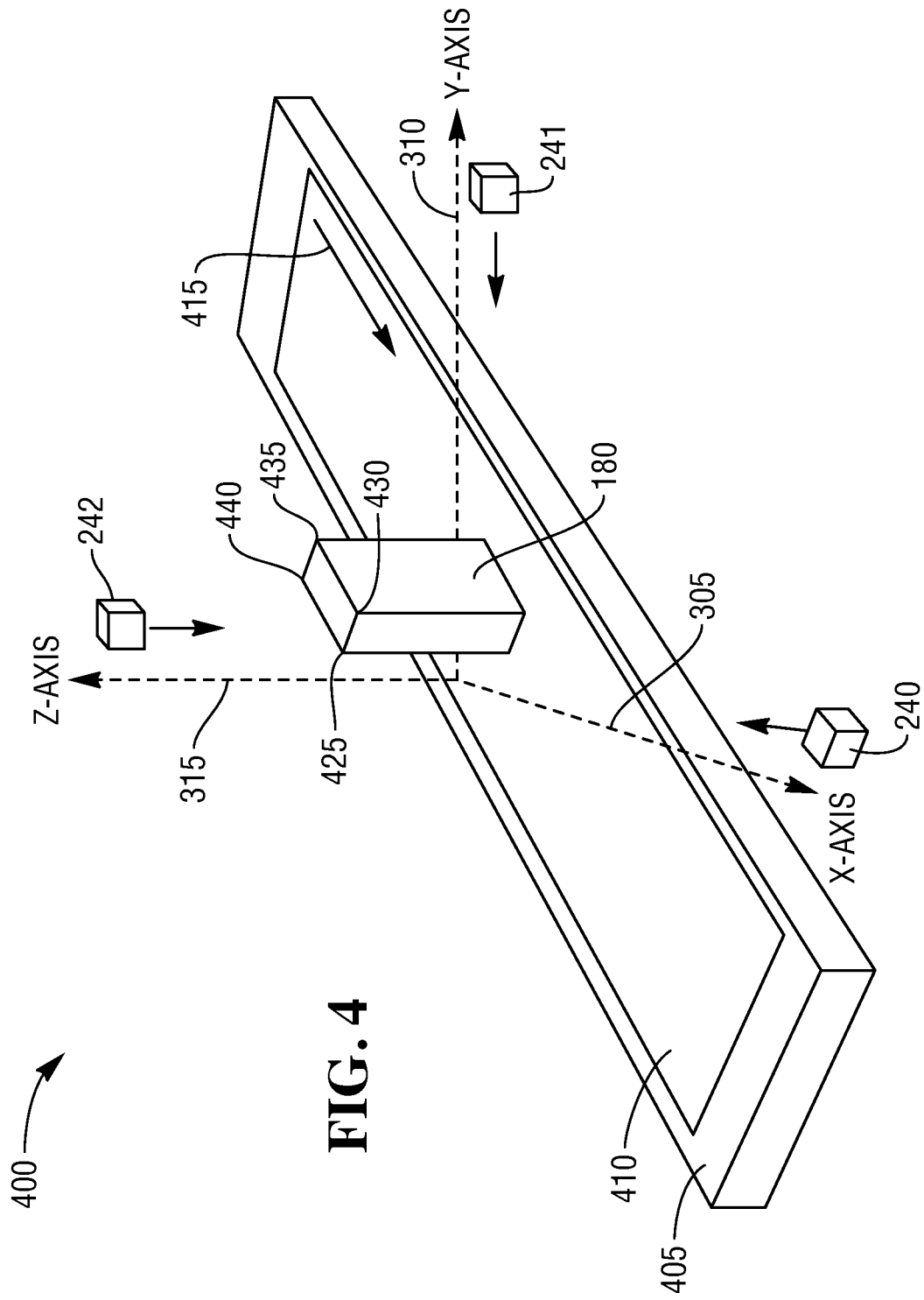

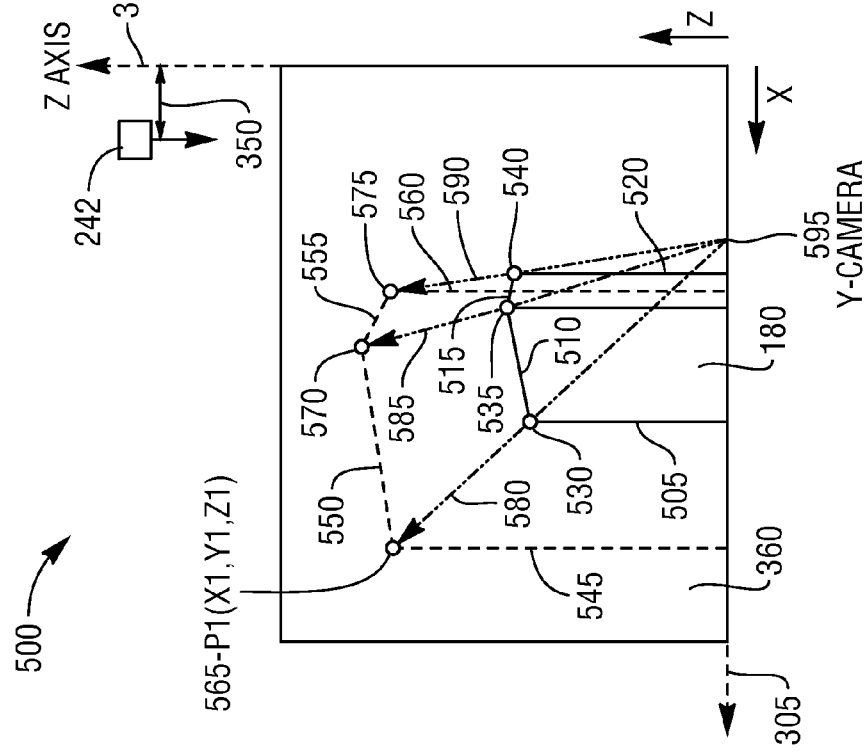

METHODS AND APPARATUS FOR DETERMINING DIMENSIONS OF AN ITEM USING 3-DIMENSIONAL TRIANGULATION

FIELD OF THE INVENTION

The present invention relates to improved methods and apparatus for identifying items and more specifically to such methods and apparatus that capture and process images to identify the dimensions of the items presented for identification using 3-dimensional (3D) triangulation.

BACKGROUND

Retail stores have used point of sale terminals with optical code scanners for years to identify items that are part of a purchase transaction. The use of an optical code scanner to identify an item by reading an optical code on an item has increased the speed of processing items for purchase. However, over the years numerous methods have been developed to make fraudulent purchases of items scanned by an optical code scanner that only identifies an item by the optical code attached to the item. These methods include placing an optical code identifying a less expensive product on a more expensive item. When the item is scanned, it is misidentified as the less expensive product. Attempts to mitigate the fraud include processing an image of items to identify the items instead of relying solely on the optical code for identification.

The computation time to identify an unknown item is decreased when the universe of known items that the unknown item is compared to is reduced by eliminating known items that do not closely match certain physical characteristics of the unknown item. Physical characteristics that can be used to limit the universe of known items include the item's shape and dimensions. Being able to identify these characteristics from an image of an item reduces the time required to identify an unknown item.

SUMMARY

Among its several aspects, the present invention seeks to overcome or ameliorate at least one of the disadvantages of the prior art, or to provide a useful alternative.

The present invention recognizes the need for a fast low cost solution to determine the dimensions of an unknown item. Among its several aspects, the present invention recognizes that it is desirable to determine one or more of an unknown item's dimensions by using two images of the item where each image is taken from a different camera. The invention uses the images of the item to identify the shape of the item, one or two corners of the item and projections onto multiple reference planes that are used to determine at least one dimension of the item. Additional images from an additional camera are used to determine the remaining dimensions of the item.

Among its several aspects, the present invention recognizes it would be desirable to uniquely identify an unknown item from a reduced universe of known items. The general shape and height of the unknown item is used to limit the number of known items that the unknown item is compared against to find a match and thus identify the unknown item.

Among its several aspects, the present invention recognizes that the computational time required to uniquely identify an item can be greatly reduced by eliminating from the search process known items with certain physical characteristics that do not match the general shape and dimensions of the unknown item. The universe of known items can be quickly reduced by preselecting a subset of known item candidates from a database that have certain physical characteristics in common with the unknown item.

In accordance with an embodiment of the present invention, there is provided a computer implemented method for determining dimensions of an unknown item. The method comprising: receiving a first image of the item captured by a first camera; identifying a first top corner of the item in the first image; determining a first point on a first reference plane that correlates to the identified first top corner; receiving a second image of the item captured by a second camera; identifying the first top corner of the item in the second image; determining a second point on a second reference plane that correlates to the identified first top corner in the second image; and determining a first dimension of the item using the first and second points and the location of the first and second cameras.

In accordance with another embodiment of the present invention, there is provided a computer implemented method for determining the dimensions of an unknown item presented for identification to point of sale terminal. The method comprising: transporting the item to a predetermined scanning area of the point of sale terminal for scanning; receiving a first image of the item captured by a first camera; identifying a first top corner of the item in the first image; determining a first point on a first reference plane that correlates to the first top corner; receiving a second image of the item captured by a second camera; identifying the first top corner of the item in the second image; determining a second point on a second reference plane that correlates to the identified first top corner in the second image; and determining a first dimension of the item using the first and second points and the location of the first and second cameras.

In accordance with still another embodiment of the present invention an apparatus for determining the dimensions of an unknown item presented to the apparatus is provided. The apparatus comprising: a first camera located at a first predetermined location and oriented to capture a first image of the item when the item is located at a predetermined location; a second camera located at a second predetermined location and oriented to capture a second image of the item when the item is located at the predetermined location; a third camera located at a third predetermined location and oriented to capture a third image of the item when the item is located at the predetermined location; a memory comprising computer instructions; a processor in communication with the memory and the first, second and third cameras where the processor is adapted to execute the computer instructions which cause the processor to perform the following steps: receiving a first image of the item captured by a first camera; identifying a first top corner of the item in the first image; determining a first point on a first reference plane that correlates to the first top corner; receiving a second image of the item captured by a second camera; identifying the first top corner of the item in the second image; determining a second point on a second reference plane that correlates to the identified first top corner in the second image; and determining a first dimension of the item using the first and second points and the location of the first and second cameras.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangements of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

FIG. 4 is a high-level drawing illustrating a conveyor belt system of the present invention.

FIG. 5 is a high-level drawing illustrating an outline of the item taken from an image captured by the y-camera.

FIG. 6 is a high-level drawing illustrating an outline of the item taken from an image captured by the x-camera.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
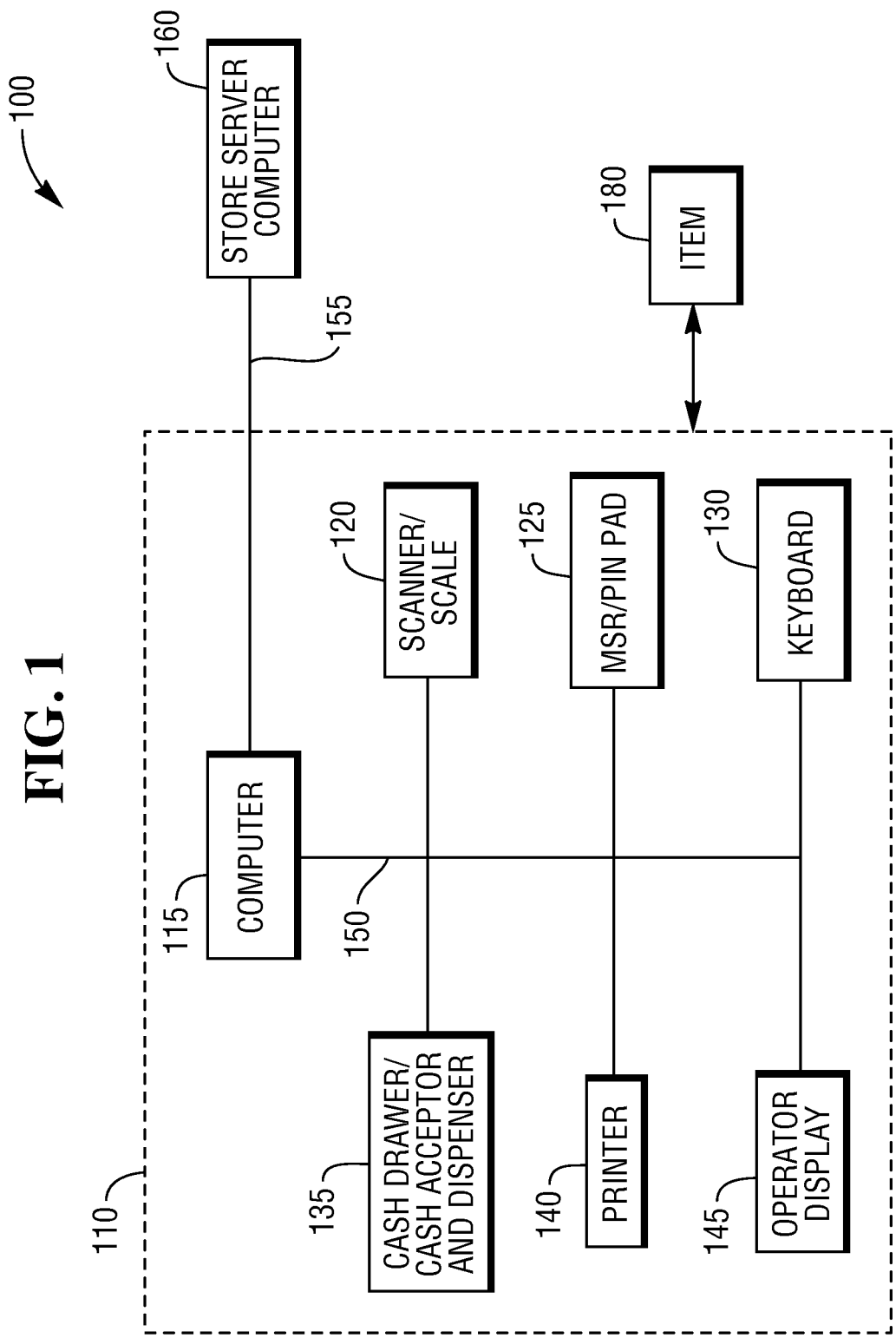
FIG. 1 is a high-level block diagram illustrating a point of sale system in accordance with the present invention.

With reference to FIG. 1, there is provided a high-level block diagram illustrating a point of sale system 100. The point of sale system 100 of the present embodiment includes a point of sale terminal 110 in communication with a store server computer 160 using a network 155. The point of sale terminal 110 performs purchase transactions by identifying one or more items 180 presented for purchase by a customer. During the purchase transactions, the point of sale terminal 110 communicates with the store server computer 160 to send and receive data related to the purchase transactions.

Although only one point of sale terminal 110 is depicted, it should be appreciated that the point of sale system 100 supports multiple point of sale terminals 110 that use the network 155 to communicate with the store server computer 160. Additionally, it should be appreciated that the point of sale terminal 110 may suitably be embodied as an assisted point of sale terminal or a customer operated point of sale terminal. In some embodiments, the point of sale system 100 includes both assisted point of sale terminals and customer operated point of sale terminals.

The network 155 may suitably include a network which uses a communications protocol based on transmission control protocol/internet protocol (TCP/IP). The network 155 may suitably include a combination of local area and wide area networks. The network 155 may further suitably include any combination of wireless and wired networks. The wireless networks include local area wireless computer networks and cellular based data networks.

The store server computer 160 includes a processor and memory where the memory includes application software. The processor of the store server computer 160 executes the application software which causes the processor to perform features and functions that support the operations of the store. The application software provides features and functions that may suitably include support for point of sale operations, an item lookup database, sales and inventory management, personnel management and customer assistance services.

The point of sale terminal 110 suitably includes a computer 115, a scanner/scale device 120, a magnetic stripe reader/personal identification number (MSR/PIN) PAD device 125, a keyboard device 130, a cash drawer/cash acceptor and dispenser 135, a printer device 140, an operator display 145 and a computer network 150. The computer network 150 may include more than one type of network, each of which is used to communicate with different devices. The computer 115 communicates with the devices over the computer network 150 which may suitably include an implementation of the industry standard universal serial bus (USB). The computer network 150 may additionally include a second network designed to communicate with a display device such as the operator display 145.

The computer 115 may suitably include a personal computer designed for use within another device such as the point of sale terminal 110. In some embodiments, the computer 115 is a single board computer. The computer 115 includes a processor, memory, a network controller for controlling the external network 155 and a computer network controller for controlling the computer network 150. The memory of the computer 115 includes computer instructions that are executed by the processor of the computer 115 and which cause the processor to control the components and devices of the point of sale terminal 110 and provide the high level functions of the point of sale terminal 110. In some embodiments, the memory includes a database and instructions that operate the database.

The MSR/PIN PAD device 125 is a magnetic stripe reader (MSR) and personal identification number (PIN) device. It reads information from the magnetic stripe on a card that is moved through the device. For example, the device 125 reads the magnetic stripes found on the back of credit, debit and loyalty cards plus magnetic stripes found on the back of some driver's licenses. The PIN PAD allows a customer or operator to enter a personal identification number that may be associated with the card. This information is then securely transmitted to the computer over the computer network 150.

The cash drawer/cash acceptor and dispenser device 135 may suitably include just a cash drawer device or just a cash acceptor and dispenser device or both. Operator assisted embodiments of the point of sale terminal 110 may suitably include just the cash drawer device because an employee will handle the currency. Customer operated embodiments of the point of sale terminal 110 may suitably include just the cash acceptor and dispenser device which secure the currency but allow a customer to give and receive currency. In yet other embodiments, both the cash drawer device and cash acceptor and dispenser device are present. The cash drawer/cash acceptor and dispenser devices 135 communicate with and are controlled by the computer 115 using the computer network 150.

The operator display 145 includes an electronic device that displays information received from the computer 115 over the computer network 150 to a customer or operator. The operator display 145 further includes a touch screen input device that detects when and where it is being touched and sends the information to the computer 115 over the computer network 150. Some embodiments have more than one operator display 145 where one operator display 145 is used by an employee operating the point of sale terminal 110 and a second operator display 145 is used by a customer that is making a purchase.

Figure 2:
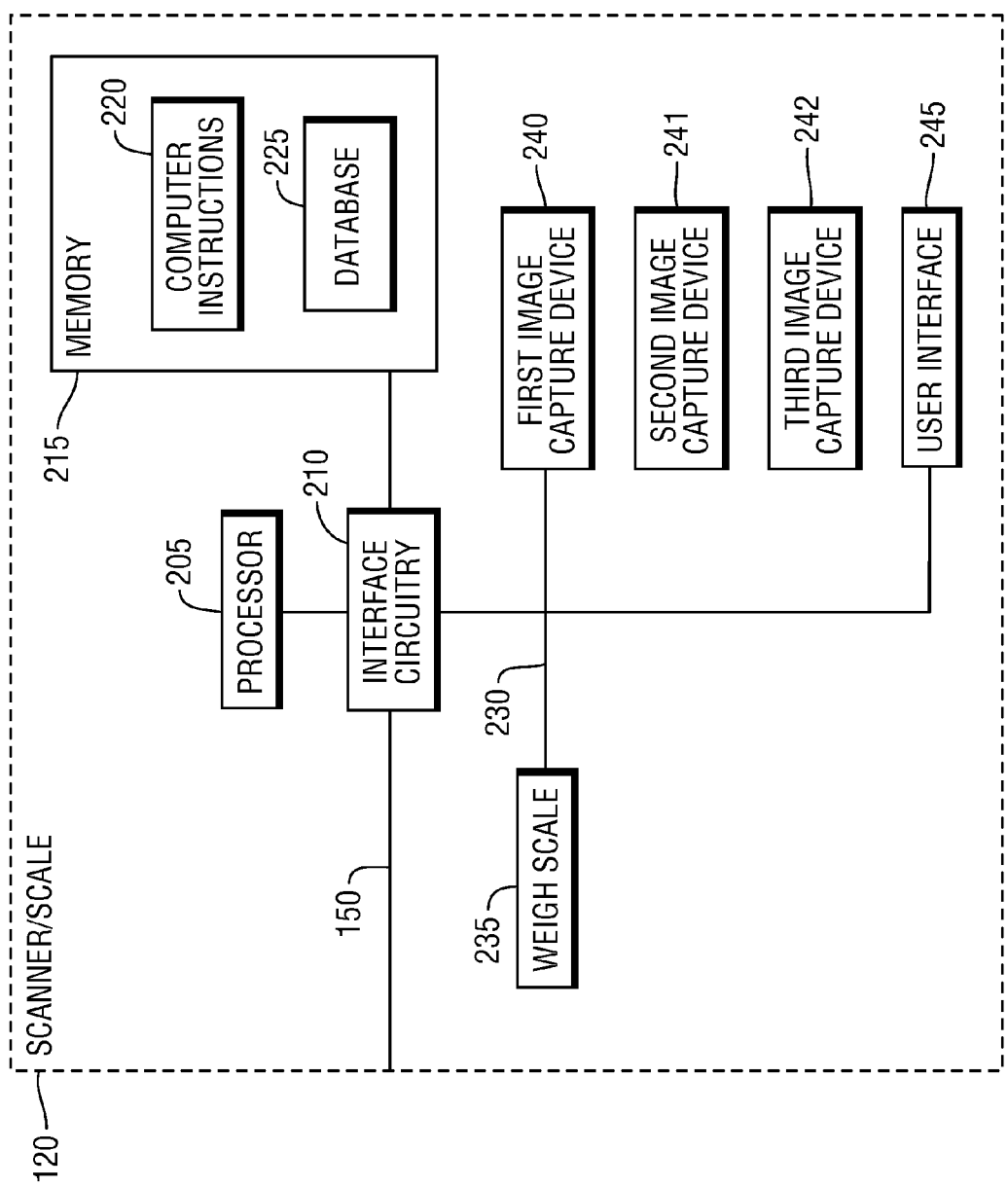
FIG. 2 is a high-level block diagram illustrating selected components of a scanner/scale.

Turning now to FIG. 2, there is provided a high-level block diagram illustrating selected components of the scanner/scale (scanner) 120. The scanner 120 identifies items 180 presented to the scanner 120 for purchase as part of a purchase transaction being performed by the point of sale terminal 110. The scanner 120 may suitably include a processor 205, interface circuitry 210, a memory 215, a weigh scale 235, a first image capture device 240, a second image capture device 241, a third image capture device 242 and a user interface 245. The interface circuitry 210 provides the electronics required for the processor 205 to communicate with the memory 215, the computer network 150 and the other devices and components of the scanner 120 using a data network 230. The interface circuitry 210 generates the data network 230 that may suitably include electronics and software to generate an industry standard universal serial bus (USB). The weigh scale 235 includes components, for example load cells, that determine the weight of items placed on the weigh scale 235 and communicates the weight to the processor 205 over the data network 230.

A multiple path image scanner with the ability to capture an image of an item presented to the scanner is shown in U.S. patent application Ser. No. 11/608,923 by Kwan entitled "A Method, System, and Apparatus for a Multiple Path Image Scanner" and is incorporated herein by reference in its entirety.

It should be noted that certain functions, such as item identification, may be performed by the processor 205 located in the scanner/scale 120 or by the processor in the computer 115 of the point of sale terminal 110. The computer 115 has computer instructions stored in the memory and executed by the processor to suitably perform the certain functions. The memory may further include a database. In this embodiment, the processor 205 performs the item identification function but in other embodiments, the computer 115 performs the item identification function.

The memory 215 includes computer instructions 220 that are executed by the processor 205 which cause the processor 205 to perform the features and functions of the scanner 120. The computer instructions 220 when executed by the processor 205 further cause the processor 205 to control the devices and components of the scanner 120. In some embodiments, the memory 215 further includes a database 225 and the computer instructions 220 include instructions that when executed by the processor 205 will cause the processor 205 to implement the features and functions of a database using the database 225.

The three image capture devices 240, 241, 242 preferably include a complementary metal oxide semiconductor (CMOS) color image capture device that captures an electronic image of an optical image directed to the CMOS image capture device. In some embodiments, other types of image capture devices are used for example, devices based on charge coupled device (CCD) technology. The electronic image is captured in the form of digital image data that represents the value of the light received by each pixel of the CMOS image capture devices 240, 241, 242. The captured images are read by the processor 205 from the image capture devices 240, 241, 242 over the data network 230. The image capture devices 240, 241, 242 capture images of items 180 presented to the scanner 120 for identification. The image capture devices 240, 241, 242 are configured with one device on each of three axes where each axis is orthogonal to the other axes. The image capture devices 240, 241, 242 each capture images of items 180 from three different directions to capture different sides of the items 180.

In other embodiments, as many as six image capture devices are used to capture images of the item 180. These images are processed to perform a virtual image rotation of the item 180 so the front surface of the item appears to face forward in the image so the front surface can be used in the item identification process.

In some embodiments, the image capture devices 240, 241, 242 further include illumination devices which are controlled by the processor 205. The illumination devices generate light directed at each of the items 180 as they are presented for identification. The illumination devices provide controlled illumination of each of the items 180 to enhance the quality of the captured image of each of the items 180. In other embodiments, the illumination devices are independent of the image capture devices 240, 241, 242.

As part of a purchase transaction processed by the point of sale terminal 110, the items 180 are presented to the scanner 120 for identification so that at least the identity and value of each of the items 180 can be added to the purchase transaction. The processor 205 receives image data for one or more captured images from the image capture device 240 where the image data includes an image of one of the presented items 180. In the present embodiment, the image data includes data for 1.3 million pixels based on the size of the CMOS image capture devices 240, 241, 242. In other embodiments, the number of pixels varies because different CMOS image capture devices with different resolutions are used.

The processor 205 receives image data from the three image capture devices 240, 241, 242 that includes images of one of the presented items 180. The processor 205 performs a shape analysis on the images to determine the location and general shape of the item 180 within the image. The shape analysis includes determining corners of the item 180 in each of the images The database 225 stored in the memory 215 of the scanner 120 includes a data record for every known item that the scanner can identify. Each data record includes information that identifies one known item, preferably an International Product Code (IPC) and physical characteristics of the item such as shape and dimensions. In some embodiments, the database includes 100,000 data records. The processor 205 compares the calculated image data for the unknown item 180 to a subset of image data records stored in the database 225. A preselect function is performed before the comparison to select the subset of known items that match certain physical characteristics of the unknown item.

Figure 3:
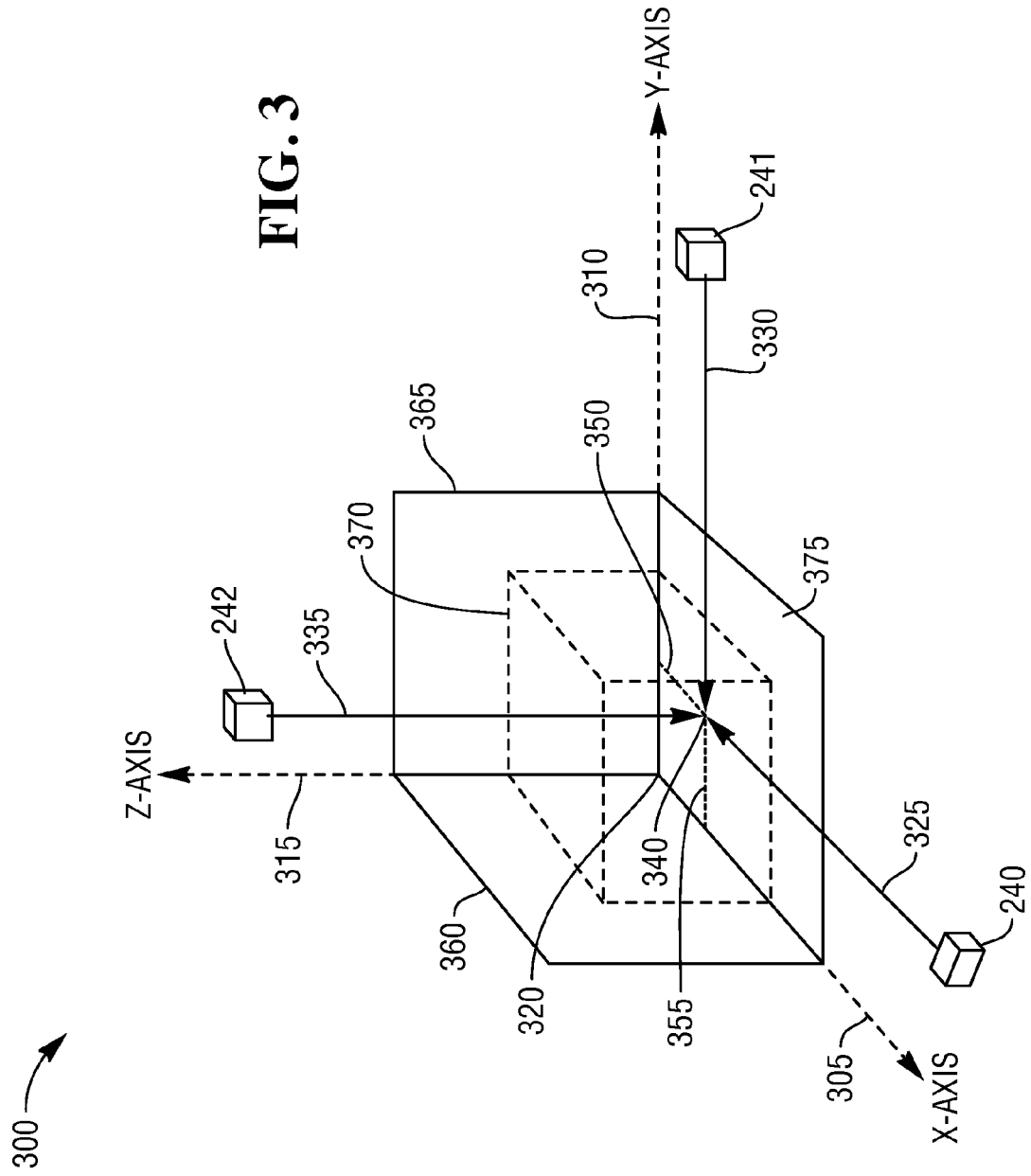
FIG. 3 is a high-level diagram illustrating a coordinate system of the present invention.

Turning to FIG. 3, there is provided a high-level diagram illustrating a coordinate system 300 of the present invention. The coordinate system 300 has a x-axis 305, a y-axis 310 and a z-axis 315. Points in the system 300 are represented using Cartesian coordinates using all three axes (X, Y, Z). Each coordinate is stated in inches measured from the origin 320. All three axes are orthogonal to each other and directional arrows represent the positive direction for each axis such that the distance from the origin 320 increases in the positive direction. The origin 320 of the axes is at the zero point of all three axes 305, 310, 315. The first image capture device 240, also known as the x-camera 240, is oriented to capture images in the Z-Y plane. The x-camera 240 is directed along a first line 325 toward an intersection point 340. The x-camera 240 is located in the X-Y plane but offset from the x-axis by a first distance 355 in the y-axis direction. In this embodiment, the first distance 355 is 5" and the x-camera 240 is located 26.5" from the origin 320 along the x-axis and at 0" on the z-axis. The coordinate of the x-camera 240 is (26.5, 5, 0).

The second image capture device 241, also known as the y-camera 241, is oriented to capture images in the Z-X plane. The y-camera 241 is directed in a second line 330 toward the intersection point 340. The y-camera 241 is located in the X-Y plane but offset from the y-axis by a second distance 350 in the x-axis direction. In this embodiment, the second distance 350 is 5" and the y-camera 241 is located 26.5" from the origin 320 along the y-axis and at 0" on the z-axis. The coordinate of the y-camera 241 is (5, 26.5, 0).

The third image capture device 242, also known as the z-camera 242, is oriented to capture images in the X-Y plane. The z-camera 242 is directed in a third line 335 toward the intersection point 340. The z-camera 242 is located 26.5" from the origin 320 along the z-axis, 5" on the x-axis and 5" on the y-axis. The coordinate of the z-camera 242 is (5, 5, 26.5).

The coordinate system 300 further includes an X-Z reference plane 360, a Y-Z reference plane 365 and a X-Y reference plane 375. These planes 360, 365, 375 are not physical planes but are imaginary planes used to project lines onto so that outlines, corners, distances and angles for the item 180 can be determined. The X-Z reference plane 360 is the X-Z plane where y=0. The Y-Z reference plane 365 is the Y-Z plane where x=0. The X-Y reference plane 375 is the X-Y plane where z=0. When an image of the item 180 is captured by the x-camera 240, an outline of the item 180 is determined on the Y-Z reference plane 365. When an image of the item 180 is captured by the y-camera 241, an outline of the item 180 is determined on the X-Z reference plane 360. When an image of the item 180 is captured by the z-camera 242, an outline of the item 180 is determined on the X-Y reference plane 375. These outlines on reference planes are used to determine the dimensions of the item 180.

In the embodiment, the location of the three cameras 240, 241, 242 provides a scan volume 370 where items located within this volume can be accurately imaged by the three cameras 240, 241, 242 and their height, width and depth determined from the images. The scan volume 370 measures approximately 10"×10"×10". The intersection point 340 is the X-Y center of the volume 370 and the volume 370 extends 10" above the X-Y plane. The cameras 240, 241, 242 are designed such that they have a depth of field sufficient to capture accurate images of items within the scan volume 370. Other embodiments may have a different sized scan volume 370 resulting in the cameras 240, 241, 242 being located in different locations.

In some embodiments, the reference planes 360, 365, 375 may suitably be placed in different locations such as being offset from the origin 320. Additionally, the origin 320 may suitably be positioned at a different location.

This embodiment depicts three image capture devices (cameras) 240, 241, 242 that are positioned to be orthogonal to each other. Other embodiments include additional cameras placed at other known locations. The additional cameras provide different views of the item to be identified. Embodiments with four, five and six cameras provide enhanced coverage of the item.

In some embodiments, the x-camera 240 and the y-camera are physically rotated 90°. The cameras are rotated to optimize the size of the scan volume 370. Any rotation of a camera is automatically taken into consideration in the methods described below.

With reference to FIG. 4, there is provided a high-level drawing illustrating a conveyor belt system 400 of the present invention. The conveyor belt system 400 includes a conveyor belt housing 405 and a conveyor belt 410 that moves the item 180 through 415 the scan volume 370. In some embodiments, the conveyor belt 405 stops moving when the item 180 is located within the scan volume 370. The location of the scan volume 370 is predetermined and images captured by one or more of the cameras 240, 241, 242 are used to determine when the item 180 is located in the scan volume 370.

In this embodiment, the item 180 has the shape of a rectangular box. The item 180 has four top corners 425, 430, 435, 440. With the item 180 configured on the conveyor belt 410 as shown, the x-camera 240 captures images where three corners 425, 430, 435 of the item 180 are visible in images. The y-camera 241 captures images from a different angle and three corners 430, 435, 440 of the item 180 are visible in the images. Corner 430 and corner 435 can be seen in images from both the cameras 240, 241. The z-camera 242 can view all four top corners 425, 430, 435, 440 of the item 180.

In some embodiments, the weight scale 235 is located below the scan volume 370 and the weight of the item 180 is determined once the item 180 is located within the scan volume 370. In these embodiments, the conveyor belt 410 may suitably be comprised of multiple belts. A first conveyor belt is connected to the weight scale 235 and isolated from the other belts and the housing 405 so that the weight of the item 180 when resting on the belt and within the scan volume 370 can be determined. A second or feeder belt transports the item 180 onto the first belt and a third or take away belt takes the item 180 from the first belt.

In some embodiments, the conveyor belt 410 transports items through a scan tunnel and the image capture devices are located within the tunnel. The scan tunnel may also include other devices for determining different physical characteristics of each item as they pass through the tunnel.

The following discussions reference FIGS. 5 and 6. FIG. 5 provides a high-level drawing 500 illustrating an outline of the item 180 taken from an image captured by the y-camera 241. FIG. 5 further includes a generated outline of the item 180 that is projected onto the X-Z reference plane 360. FIG. 6 provides a high-level drawing 600 illustrating an outline of the item 180 taken from an image captured by the x-camera 240. FIG. 6 further includes a generated outline of the item 180 that is projected onto the Y-Z reference plane 365. From the two drawings 500, 600, the height of the item 180 is determined. A small circle is used to highlight points of interest in the two figures. The points of interest include certain vertices, intersections of lines and intersections of lines with planes.

In FIG. 5, the drawing 500 illustrates a first outline of the item 180 which is taken from an image captured by the y-camera 241. The y-camera 241 is located at point 595 but the perspective of the drawing 500 is from a point that is further out and higher up than the y-camera 241. The first outline includes four y-edges 505, 510, 515, 520. The four y-edges 505, 510, 515, 520 define three top y-corners 530, 535, 540 of the item 180. Y-edges are edges of an item as depicted in an image captured by the y-camera 241. Y-corners are corners of an item as depicted in an image captured by the y-camera 241. The three y-corners 530, 535, 540 are at the same height above the X-Y plane. Y-corner 530 represents the outline of corner 430 of the item 180. Y-corner 535 represents the outline of corner 435 of the item 180 and y-corner 540 represents the outline of corner 440 of the item 180.

A second outline of the item 180 is projected onto the X-Z reference plane 360. The second outline is defined by four y-edges 545, 550, 555, 560 which define three y-corners 565, 570, 575. The location of the y-corner 565 is determined by a line 580 that originates at the y-camera 241 and extends through the y-corner 530 of the item 180 and intersects the X-Z reference plane 360 at y-corner 565. The y-camera 241 is located at coordinates (5,26.5,0). From the perspective of the y-camera 241, the first and second outlines are at the same location. Stated another way, the second outline is hidden behind the first outline. The location of the y-corner 570 is determined by a line 585 that originates at the y-camera 241 and extends through the y-corner 535 of the item 180 and intersects the X-Z reference plane 360 at y-corner 570. The location of the y-corner 575 is determined by a line 590 that originates at the y-camera 241 and extends through the y-corner 540 of the item 180 and intersects the X-Z reference plane 360 at y-corner 575.

Prior to the start of normal item scanning operations, the x-camera 240, the y-camera 241 and z-camera 242 are calibrated. Part of the calibration process involves correlating locations on each reference plane to pixel locations in the respective camera. The y-camera 241 views the XZ reference plane 360, the x-camera 240 views the YZ reference plane 365 and the z-camera 242 views the XY reference plane 375. One method of calibrating the cameras 240, 241, 242 is to place a calibration drawing in the reference plane position that is viewed by the camera being calibrated. The calibration drawing includes multiple elements with known dimensions at known coordinates on the drawing. An image of the calibration drawing is captured and the elements are identified from the image. The locations and sizes of each element are then determined using the pixel data of the image. The determined locations and sizes are correlated with the known element's locations and sizes to determine a set of rules for converting pixel data to locations on the corresponding reference plane.

Correlating pixel data to known locations can be further illustrated in an example calibration drawing that includes an element that is a horizontal line with a length of 1". The physical coordinates of the line's end points are also known. An image of the drawing with the line is captured and analyzed. From the pixel data of the image, it is determined that the line has a length of 20 pixels. That is it takes 20 pixels to store the image of the line. Therefore in the horizontal direction of the image, 20 pixels equals 1 inch. The vertical direction can have a different value. The endpoints of the line are also identified using pixel data and then correlated to the actual location of the endpoints on the reference plane. Once correlated, a single pixel of an image can be translated to a single position on the respective reference plane. Other elements, at different locations and that extend in different directions and with different shapes, are used to fully calibrate each camera 240, 241, 242 with respect to the camera's corresponding reference plane. The calibration process produces calibration data for each camera 240, 241, 242 which is stored for later use during the item scanning process. The calibration data is used to determine the location of an item's outline that is projected onto a reference plane from an actual item that is being scanned. An image of the item 180 is captured by each camera 240, 241, 242 and the calibration data is used to determine the location of an outline of the item 180 that is projected onto the corresponding reference plane.

Corner P1 565 located at coordinates (X1, Y1, Z1) is a projection on the X-Z reference plane 360 which means the Y axis coordinate is 0 (Y1=0). The variables X1 and Z1 are determined by using the calibration data for the y-camera 241 to convert the image pixel data representing the y-corner 530 to a location on the XZ reference plane 360 for y-corner 565. It should be noted that the outline of the item 180 does not directly equate to the actual height, width or depth of the item 180. Items that are closer to the y-camera 241 will appear to be larger in images whereas items that are farther from the y-camera 241 will appear to be smaller in the images.

FIG. 6 shows an x-camera 240 view of the item 180 with information from the y-camera 241 view superimposed. The x-camera 240 is located at point 680 but the perspective of the drawing 600 is from a point that is farther out and higher up than the x-camera 240. The y-camera 241 is shown on the far right side at point 685. The item 180 is represented by a third outline that includes four x-edges 605, 610, 615, 620. The four x-edges 605, 610, 615, 620 define three top x-corners 690, 692, 694. X-edges are edges of an item as depicted in an image captured by the x-camera 240. X-corners are corners of an item as depicted in an image captured by the x-camera 240. The three x-corners 690, 692, 694 are at the same height above the X-Y plane. X-corner 690 represents the outline of corner 425 of the item 180. X-corner 692 represents the outline of corner 430 of the item 180 and y-corner 694 represents the outline of corner 435 of the item 180.

A fourth outline of the item 180 is projected onto the Y-Z reference plane 365. The forth outline is defined by four x-edges 630, 635, 640, 645 which define three x-corners 650, 655, 660. The location of the x-corner 655 is determined by a line 670 that originates at the x-camera 240 and extends through the x-corner 692 of the item 180 and intersects the Y-Z reference plane 365 at x-corner 655. The x-camera 240 is located at coordinates (26.5,5,0). From the perspective of the x-camera 240, the third and fourth outlines are at the same location. Stated another way, the fourth outline is hidden behind the third outline.

In this drawing 600, point P2 565 is the same as point P1 565 and both have the same coordinates. X1 and Z1 were determined from the image captured by the y-camera 241 in FIG. 5. Y1 is equal to 0 because the point is on the X-Z reference plane 360. From the drawing 600, the physical corner 430 of the item 180 lies at the intersection of a first line 670 and second line 675. The first line P3-P5 670 extends between point P3 680, the x-camera 240 and the point P5 655 which is a corner of the outline projected on the Y-Z reference plane 365. The second line P4-P2 675 extends between point P4, the y-camera 241 and the point P2 565 which is located on the X-Z reference plane 360. The intersection point Pq 692 is at coordinate (Xq, Yq, Zq). The following information is known about the different points:

P2=(X1,Y1,Z1)=(X1, 0, Z1); X1 & Z1 are determined from y-camera image data
P3=(X3,Y3,Z3)=(26.5, 5, 0)=position of the x-camera 240
P4=(X4,Y4,Z4)=(5, 26.5, 0)=position of the y-camera 241
P5=(X5,Y5,Z5)=(0,Y5, Z5); Y5 & Z5 are determined from x-camera image data The first line 670 can be expressed with a first vector equation:

$$\begin{pmatrix} x \\ y \\ z \end{pmatrix} = P3 + t(P5 - P3) = \begin{pmatrix} P3(X3) \\ P3(Y3) \\ P3(Z3) \end{pmatrix} + t \begin{pmatrix} P5(X5) - P3(X3) \\ P5(Y5) - P3(Y3) \\ P5(Z5) - P3(Z3) \end{pmatrix}$$

The second line 675 can be expressed with a second vector equation:

$$\begin{pmatrix} x \\ y \\ z \end{pmatrix} = P4 + s(P2 - P4) = \begin{pmatrix} P4(X4) \\ P4(Y4) \\ P4(Z4) \end{pmatrix} + s \begin{pmatrix} P2(X1) - P4(X4) \\ P2(Y1) - P4(Y4) \\ P2(Z1) - P4(Z4) \end{pmatrix}$$

The point of intersection between the first line 670 and the second line 675 is determined by solving the following linear equations:

$$X3+t(X5-X3)=X4+s(X1-X4)$$

$$Y3+t(Y5-Y3)=Y4+s(Y1-Y4)$$

$$Z3+t(Z5-Z3)=Z4+s(Z1-Z4)$$

When values for t and s are found that solve the above equations, the height of the item 180 is the value for Zq which is found by solving either of the following equations using either of the found values t or s:

$$Zq=Z3+t(Z5-Z3)$$ or $$Zq=Z4+s(Z1-Z4)$$

Calibration errors from the cameras and pixel interpolation errors may prevent a determination that the first line 670 intersects the second line 675 at an intersection point. Due to the errors, the two lines 670, 675 may just miss intersecting each other. At their closest point, the two lines 670, 675 may just miss intersecting each other by a fraction of an inch. In the real world, the two lines 670, 675 do intersect, but the accumulation of errors can cause the equations to fail to detect the intersection point.

In some embodiments, this problem is overcome by performing an iterative process of solving the linear equations. The iterative process divides the length of the first line 670 into multiple smaller lengths, for example lengths of 1/10 of an inch. If the first line 670 is 10" long, the line 670 would be divided into 100 smaller segments each 1/10 of an inch long. Starting at one end of the line 670, the iterative process then determines the coordinate of an end point of each segment using the first vector equation. Then a point on the second line 675 is determined using the second vector equation where at least one of the coordinate dimensions of the end point from the first line 670 is equal to the corresponding coordinate dimension on the second line 675. The distance between the end point on the first line 670 and the point on the second line 675 is determined. If the distance is within a predetermined tolerance value, the distance is stored and the iterative process continues to the next segment until the subsequent determined distance values fail to decrease from the prior value. When a subsequent determined distance value is larger than the prior value, the prior value and its coordinate is then determined to be the intersection point between the two lines 670, 675. Other methods can be used to overcome the accumulated errors related to camera calibration and interpolation.

FIGS. 5 and 6 describe a method of determining at least one dimension of an item 180. In this example, the height of the item 180 is determined. From the same two cameras the length 510 of the item 180 can be determined by finding the location of the second corner 535 and then determining the length between corner 530 and corner 535. The second corner 535 is adjacent to corner 530. The width 610 of the item 180 can be determined using images from the x-camera 240 and the z-camera 242 and the same method described above. The width 610 is the distance between corner 690 and its adjacent corner 692. Images from the x-camera 240 and the z-camera 242 are used to determine the coordinate of corner 690. Corner 692 was determined above so the distance between the two corners 690, 692 is the width of the item 180. Therefore using the above method, the height 505, length 510 and width 610 of the item 180 is determined from images taken from the cameras 240, 241, 242.

Figure 7:
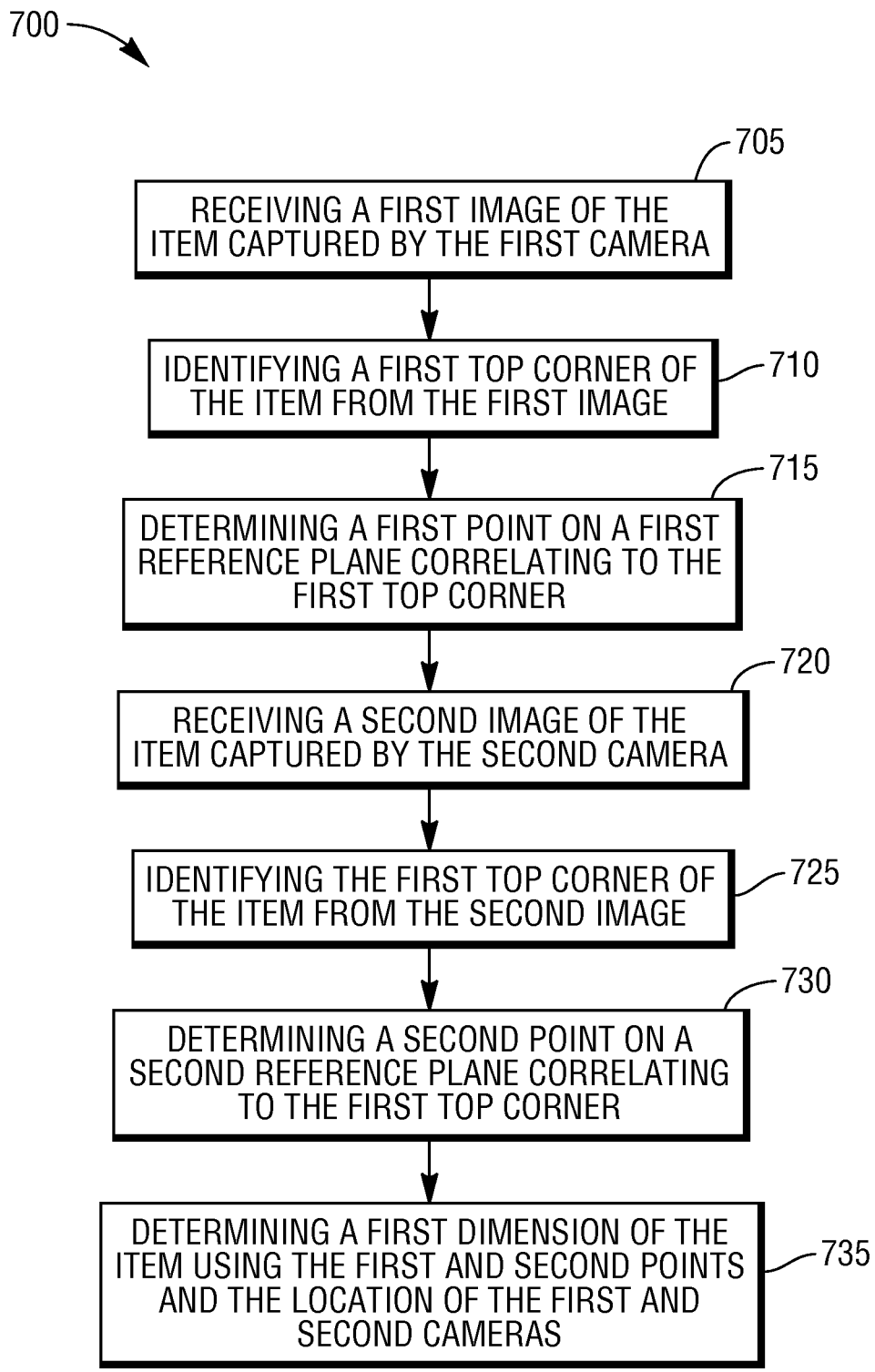
FIG. 7 is a high-level flow diagram illustrating a method of operating the scanner of the present invention to identify the item.

Turning now to FIG. 7, there is provided a high-level flow diagram illustrating a method of operating the scanner 120 to identify the item 180. In this method 700, an unknown item 180 is presented to the scanner 120 for identification as part of a purchase transaction being performed by the point of sale terminal 110. The item 180 is determined to be in the general shape of a box. This method 700 includes the above described processes for determining the physical dimensions of the item 180 being identified. The actions described in the following steps are performed by the processor 205 when the processor 205 executes the computer instructions 220 stored in the memory 215. In some embodiments, the one or more of the actions are performed by a processor included in the computer 115 of the point of sale terminal when the processor executes computer instructions stored in a memory also included in the computer 115.

The steps below perform normal item scanning to determine physical characteristics of an unknown item. Prior to starting normal item scanning, the devices of the point of sale terminal 110 are calibrated. The calibration process may suitably be performed as part of the initial setup for the terminal and/or periodically to correct for any changes to the devices or their location. The calibration process generates unique calibration data for each camera 240, 241, 242 attached to the terminal 110. The calibration data is used to determine locations projected on the different reference planes 360, 365, 375 from images captured by the cameras 240, 241, 242.

In step 705, the unknown item 180 is moved to a predetermined location where the processor 205 receives a first image of the item 180 that is captured by the y-camera 241 (first camera). In some embodiments, the item 180 is transported to the predetermined location by the conveyor belt 410. Images from one or more of the cameras 240, 241, 242 are used to determine when the item 180 has reached the predetermined location. The conveyor belt 410 may be stopped once the item 180 reaches the predetermined location and remains stopped until the parameters of the item 180 have been determined. Elements of the first image are depicted in drawing 500.

In step 710, the processor 205 identifies a first top corner 530 of the item 180 from the first image (depicted in drawing 500). The processor 205 may first identify the outline edges of the item 180 and then identify the first top corner 530.

In step 715, the processor 205 determines a first point 565 on a first reference plane 360 that correlates to the first top corner 530. This process is described above in detail.

In step 720, the processor 205 receives a second image of the item 180 captured by the x-camera 240 (second camera). Elements of the second image are depicted in drawing 600.

In step 725, the processor 205 identifies the first top corner 692 of the item 180 from the second image (depicted in drawing 600). The first top corner 430 for the item 180 is depicted in FIG. 4. In FIG. 5, the first top corner 430 is labeled 530 and in FIG. 6, it is labeled 692. The first top corner 430 has different labels because the corner is seen from different perspectives in FIG. 5 and FIG. 6.

In step 730, the processor 205 determines a second point 655 on a second reference plane 365 that correlate to the first top corner 692. This process is described above in detail.

In step 735, the processor 205 determines a first dimension of the item 180 using the first and second points 655, 565 and the locations 680, 685 of the x-camera 240 and the y-camera 241. The first dimension of the item 180 is determined by first determining the coordinate of the first corner 692 (430 in FIG. 4). The first dimension or the height of the item 180 is the z-axis component of the coordinate of the first corner 692.

In some embodiments, the database 225 includes a plurality of known item candidates. Each item candidate includes the shape and dimensions of the item and additional descriptions of the item. These candidate items are compared to the determined parameters of the unknown item 180 to determine the identity of the unknown item 180. Once the dimensions of the item 180 are determined, all candidate items that do not match the dimensions of the items 180 are removed from further consideration as a match for the item 180.

Although the present invention has been described with particular reference to certain preferred embodiments thereof, variations and modifications of the present invention can be effected within the spirit and scope of the following claims.

What is claimed is:

1. A computer implemented method for determining dimensions of an unknown item by a scanner during a purchase transaction, the method comprising:
   receiving a first image of the item captured by a first camera of the scanner;
   identifying a first top corner of the item in the first image;
   determining a first point on a first reference plane that correlates to the identified first top corner;
   receiving a second image of the item captured by a second camera of the scanner;
   identifying the first top corner of the item in the second image;
   determining a second point on a second reference plane that correlates to the identified first top corner in the second image;
   determining a first dimension of the item using the first and second points and the location of the first and second cameras; and
   using the first dimension of the item to identify the item for inclusion in the purchase transaction.

2. The method of claim 1, further comprising:
   identifying a second top corner of the item in the first image wherein the second top corner is adjacent to the first top corner;
   determining a third point on the first reference plane that projects from the second top corner;
   identifying the second top corner of the item in the second image;
   determining a fourth point on the second reference plane that projects from the identified second top corner in the second image;
   determining a second dimension of the item using the third and fourth points and the location of the first and second cameras; and
   using the second dimension of the item to identify the item.

3. The method of claim 2 wherein determining the first dimension of the item includes determining a first coordinate of the first top corner of the item and determining the second dimension includes determining a second coordinate of the second top corner of the item and wherein the second dimension is the distance between the first and second coordinates.

4. The method of claim 1, further comprising:
   receiving a third image of the item captured by a third camera of the scanner;
   identifying a third top corner of the item in the third image wherein the third top corner is adjacent to the first top corner;
   determining a fifth point on a third reference plane that correlates to the third top corner;
   identifying the third top corner of the item in the first image;
   determining a sixth point on the first reference plane that correlates to the identified third top corner in the first image;
   determining a third dimension of the item using the fifth and sixth points and the location of the first and third cameras; and
   using the second dimension of the item to identify the item.

5. The method of claim 4, wherein determining the first dimension of the item includes determining a first coordinate of the first top corner of the item and determining the third dimension includes determining a third coordinate of the third top corner of the item and wherein the third dimension is the distance between the first and third coordinates.

6. The method of claim 4, wherein the first dimension is the height of the item, the second dimension is the length of the item and the third dimension is the width of the item and wherein the dimensions of the item are used to reduce the number of possible candidates that would identify the item.

7. The method of claim 1, further comprising:
   performing a calibration on each camera wherein a drawing with known elements is placed at the location of a reference plane of the scanner; and
   generating calibration data after identifying the known elements from a captured image of the drawing wherein each camera has unique calibration data.

8. The method of claim 7, wherein determining the first point includes using calibration data for the first camera and wherein determining the second point includes using calibration data for the second camera.

9. A computer implemented method for determining the dimensions of an unknown item presented for identification to a scanner of a point of sale terminal during a purchase transaction, the method comprising:
   transporting the item to a predetermined scanning area of the scanner for scanning;
   receiving a first image of the item captured by a first camera of the scanner;
   identifying a first top corner of the item in the first image;
   determining a first point on a first reference plane that correlates to the first top corner;
   receiving a second image of the item captured by a second camera of the scanner;
   identifying the first top corner of the item in the second image;
   determining a second point on a second reference plane that correlates to the identified first top corner in the second image;
   determining a first dimension of the item using the first and second points and the location of the first and second cameras; and
   using the first dimension of the item to identify the item for inclusion in the purchase transaction.

10. The method of claim 9, further comprising:
    receiving a weight for the item while the item is located in the predetermined scanning area.

11. The method of claim 9, further comprising:
    identifying a second top corner of the item in the first image wherein the second top corner is adjacent to the first top corner;
    determining a third point on the first reference plane that projects from the second top corner;
    identifying the second top corner of the item in the second image;
    determining a fourth point on the second reference plane that projects from the identified second top corner in the second image;
    determining a second dimension of the item using the third and fourth points and the location of the first and second cameras; and
    using the second dimension of the item to identify the item.

12. The method of claim 11 wherein determining the first dimension of the item includes determining a first coordinate of the first top corner of the item and determining the second dimension includes determining a second coordinate of the second top corner of the item and wherein the second dimension is the distance between the first and second coordinates.

13. The method of claim 9, further comprising:
receiving a third image of the item captured by a third camera of the scanner;
identifying a third top corner of the item in the third image wherein the third top corner is adjacent to the first top corner;
determining a fifth point on a third reference plane that correlates to the third top corner;
identifying the third top corner of the item in the first image;
determining a sixth point on the first reference plane that correlates to the identified third top corner in the first image;
determining a third dimension of the item using the fifth and sixth points and the location of the first and third cameras; and
using the second dimension of the item to identify the item.

14. The method of claim 13, wherein determining the first dimension of the item includes determining a first coordinate of the first top corner of the item and determining the third dimension includes determining a third coordinate of the third to corner of the item and wherein the third dimension is the distance between the first and third coordinates.

15. The method of claim 13, wherein the first dimension is the height of the item, the second dimension is the length of the item and the third dimension is the width of the item.

16. A scanning apparatus for determining the dimensions of an unknown item during a purchase transaction, the apparatus comprising:
a first camera located at a first predetermined location and oriented to capture a first image of the item when the item is located at a predetermined scanning location;
a second camera located at a second predetermined location and oriented to capture a second image of the item when the item is located at the predetermined scanning location;
a third camera located at a third predetermined location and oriented to capture a third image of the item when the item is located at the predetermined scanning location;
a memory comprising computer instructions;
a processor in communication with the memory and the first, second and third cameras where the processor is adapted to execute the computer instructions which cause the processor to perform the following steps:
receiving a first image of the item captured by a first camera;
identifying a first top corner of the item in the first image;
determining a first point on a first reference plane that correlates to the first top corner;
receiving a second image of the item captured by a second camera;
identifying the first top corner of the item in the second image;
determining a second point on a second reference plane that correlates to the identified first top corner in the second image;
determining a first dimension of the item using the first and second points and the location of the first and second cameras; and
using the first dimension of the item to identify the item for inclusion in the purchase transaction.

17. The scanning apparatus of claim 16, wherein the processor performs the following additional steps:
identifying a second top corner of the item in the first image wherein the second top corner is adjacent to the first top corner;
determining a third point on the first reference plane that projects from the second top corner;
identifying the second top corner of the item in the second image;
determining a fourth point on the second reference plane that projects from the identified second top corner in the second image;
determining a second dimension of the item using the third and fourth points and the location of the first and second cameras; and
using the second dimension of the item to identify the item.

18. The scanning apparatus of claim 17 wherein determining the first dimension of the item includes determining a first coordinate of the first top corner of the item and determining the second dimension includes determining a second coordinate of the second top corner of the item and wherein the second dimension is the distance between the first and second coordinates.

19. The scanning apparatus of claim 17, wherein the processor performs the following additional steps:
receiving a third image of the item captured by a third camera;
identifying a third top corner of the item in the third image wherein the third top corner is adjacent to the first top corner;
determining a fifth point on a third reference plane that correlates to the third top corner;
identifying the third top corner of the item in the first image;
determining a sixth point on the first reference plane that correlates to the identified third top corner in the first image;
determining a third dimension of the item using the fifth and sixth points and the location of the first and third cameras; and
using the second dimension of the item to identify the item.

20. The scanning apparatus of claim 19, wherein determining the first dimension of the item includes determining a first coordinate of the first top corner of the item and determining the third dimension includes determining a third coordinate of the third top corner of the item and wherein the third dimension is the distance between the first and third coordinates.

* * * * *